Patented Apr. 5, 1949

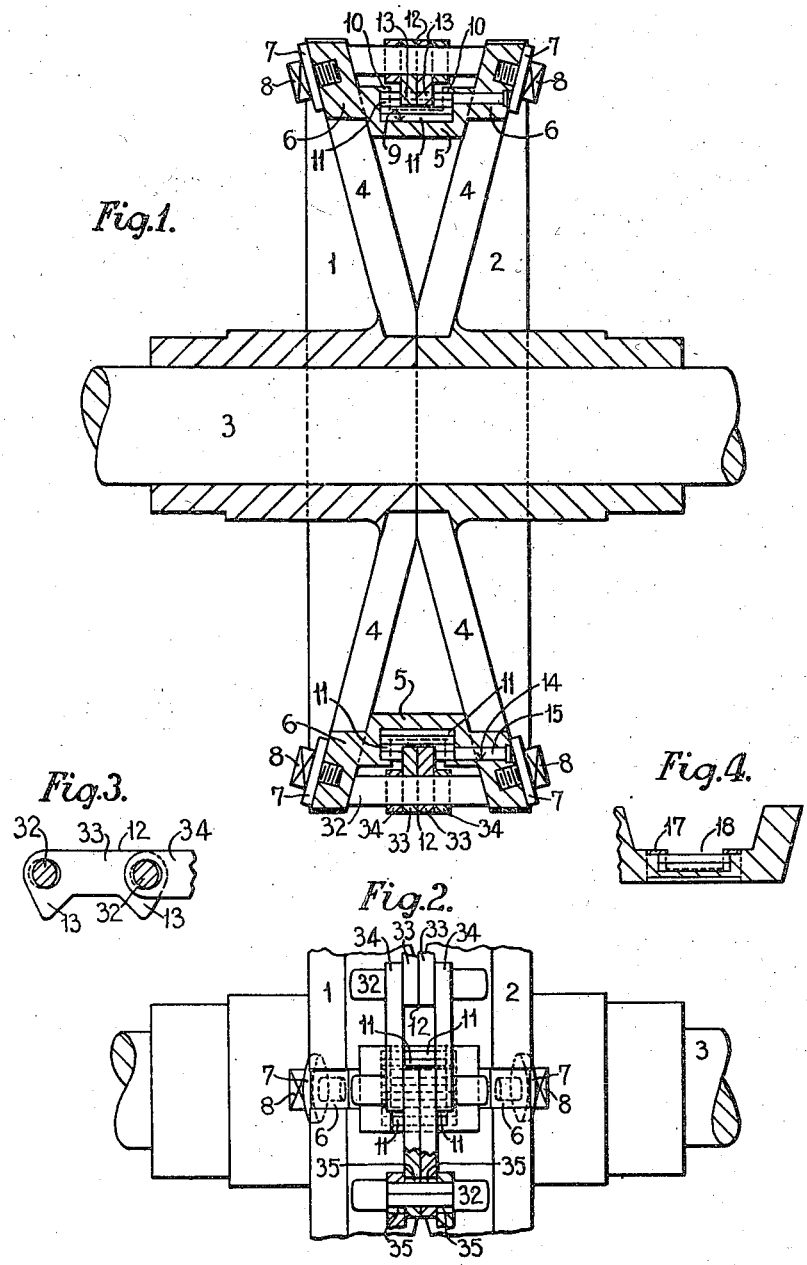

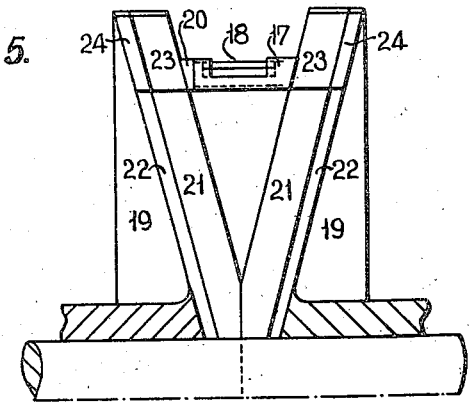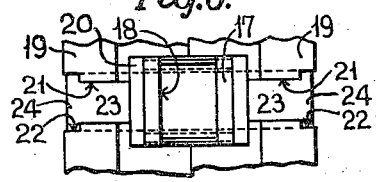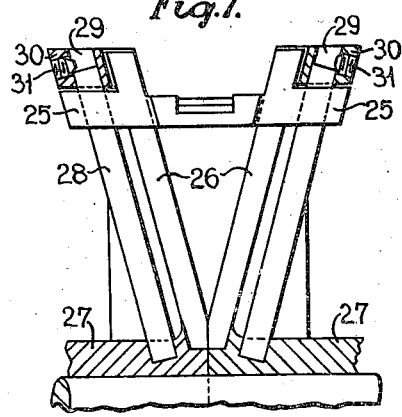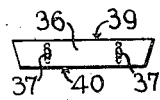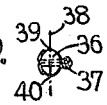

2,466,365

UNITED STATES PATENT OFFICE 2,466,365

INFINITELY VARIABLE SPEED GEAR

Alfred Booth, Pendleton, Salford, England, assignor of one-half to Fred Horace Coles, Epsom, England Application April 2, 1945, Serial No. 586,210
In Great Britain April 1, 1944

8 Claims. (Cl. 74—230.17)

(Granted under the provisions of sec. 14, act of March 2, 1927; 357 O. G. 5)

This invention relates to that kind of infinitely variable speed gear wherein expanding V-pulleys have slides forming a driving connection with teeth on an endless chain or belt employed to transmit motion from one expanding V-pulley to another.

The object of my invention is to provide a novel construction of infinitely variable speed gear of the said kind, which is simple and relatively uncostly to produce whilst having a more or less positive action.

An infinitely variable speed gear of the hereinbefore specified kind in accordance with my invention has the teeth on the chain or belt adapted to encounter a mass of rollers held on the slide and rollable on each other and on supporting surfaces within a confined area so as to permit the teeth to penetrate the said mass and effect such displacement of the individual rollers as is necessary for the said teeth to penetrate the mass of rollers.

The depth of the mass of rollers may be equal to about twice the roller diameter or more. Where it is three or more times the said diameter, check means, such as inclines or a roller rotatable only in an unchangeable position, may be provided to reduce the mobility of the rollers.

Each slide may be of unitary construction and open at the outer side and have flanges which retain the rollers on the slide by engagement with the ends of the rollers.

A closable filling hole may be provided on the slide for insertion of the rollers into position thereon.

Alternatively the rollers may be held in their slides by removable spring clips.

The slides may have integral lugs held in engagement with slots in the V-pulleys by collars or washers bearing on the side of the slot at the rear and provided on screws screwed into the lugs.

Alternatively the slides may have perforated lugs engaging and sliding on guide rods provided on the V-pulleys.

Lugs on each slide are extended outwards so as to fill the slots at the place where bearing faces of the chain or belt ride.

Where a chain is employed it may consist of toothed links connected together by pivot pins, the links and pins being held together against relative lateral movement by the provision in the pins of recesses in which the links are held engaged by the chain tension, or of pins provided with split pins, whereby the necessity for riveting, screws, nuts or other fastening devices to hold the parts of the chain together is dispensed with.

Each link may have two teeth near the ends thereof or a centrally disposed single tooth.

The floors of the recesses may have the same degree of curvature as the periphery of the pin and bear against the sides of holes formed in the links and of the same diameter as the pins, whereby the parts can be assembled by merely threading the pins through the links and bearing surfaces between the links and pins of substantial areas are obtained.

I attain the said object by the means illustrated in the accompanying drawings, wherein—

Figure 1 is a front view in section of an expanding V-pulley carrying a driving chain.

Figure 2 is a fragmentary plan view thereof.

Figure 3 is a side view of a portion of the said driving chain.

Figure 4 is a fragmentary front view in section of a slide and illustrates an alternative construction of slide.

Figure 5 is a front view in section of a portion of an expanding V-pulley and illustrates another construction of pulley.

Figure 6 is a fragmentary plan view thereof.

Figure 7 is a front view in section of a portion of an expanding V-pulley and illustrates still another construction of pulley.

Figure 8 is a front elevation of a chain pin and illustrates another construction of chain pin.

Figure 9 is an end view of the said chain pin.

Referring to the drawings, in the construction shown in Figures 1 to 3, as applied by way of example to an infinitely variable speed gear comprising two expanding V-pulleys each having two parts 1 and 2 respectively, one or each of which is displaceable axially relative to the other on a shaft 3, each expanding V-pulley is as follows:

The parts 1 and 2 have registering, radial guide slots 4 provided in them and the said slots break into the opposed or front faces of the parts 1 and 2 and into the remaining or rear faces of the said parts. A plurality of single-piece slides 5 equal in number to the slots 4 in the pulley part are provided between the pulley parts 1 and 2. Each slide 5 has at one end an integral lug 6 engaging and forming a sliding fit with one of the slots 4 in the pulley part 1. Each slide 5 has at the other end an integral lug 6 engaging and forming a sliding fit with the registering slot 4 in the pulley part 2. Each lug 6 is held against withdrawal from its slot 4 by a collar or washer 7 riding on the rear face of the pulley part 1 or 2 and either loosely mounted on a headed screw 8 screwed into the end of the lug 6 or formed integral with the screw 8 screwed into the end of the lug 6. The pulley parts 1 and 2 and slides 5 are thus connected together to prevent disconnection whilst leaving the slides 5 free to slide radially outwards and inwards and the axial distance between the pulley parts 1 and 2 to correspondingly decrease and increase.

Each slide 5 has a supporting surface 9 situated between the pulley parts and bounded at the ends by outwardly extending walls provided at their extremities with opposed flanges 10. Resting on the supporting surfaces and on each other there are a plurality of loose, elongated cylindrical rollers 11 having flat or rounded extremities and situated parallel with the pulley axis with their ends overalpping the flanges 10 which together with the supporting surface 9 and bounding walls contains them in a confined area without preventing displacement of the rollers individually within the confined area. The area may be of such form and size that whilst one layer of rollers 11 is in contact with the supporting surface 9, a second layer of rollers 11 is separated from the said surface by the first layer. If desired further layers each separated from the supporting surface by the preceding layers may be provided. The confined area is not completely filled with rollers, the number chosen being such that by displacement thereof within the confined area a chain or belt tooth can penetrate and lodge itself to a suitable depth in the mass, for example to a depth equal to about slightly less than twice the roller diameter. Figure 1 shows an area containing four layers of rollers 11.

In conjunction with the hereinbefore described construction I provide an endless belt or chain 12 having bearing surfaces which ride on the opposed conical faces of the pulley parts and inwardly directed teeth 13.

In operation, as the belt 12 rides on to the pulley, some of the belt teeth 13 come into register with and are approached by the slides 5 in a successive manner. During the approach of each slide to a registering tooth 13, the tooth 13 enters the mass of rollers 11 confined in the slide 5 and the rollers 11 roll on each other and the supporting surface 9 to form in the mass an accommodating space roughly equal in end shape to the profile of the tooth 13. The desired driving connection, which is more positive than frictional connection between friction surfaces on an endless belt or chain and the pulley is thus established. As a tooth 13 can penetrate the mass of rollers at different places, the desired driving connection is established at all radiuses to which the slides 5 can be adjusted. The feature of direct action between the teeth 13 and rollers 11 enables the construction and assembly of the transmission elements of the gear to be made simple and relatively uncostly.

To enable the rollers 11 to be inserted into the said confined area, one of the said walls and the corresponding lug 6 are provided with a continuous aperture 14 of slightly larger diameter than the rollers 11, so that the rollers 11 can be slid therethrough axially, one by one into the said area. A plug 15 is provided to close the aperture and may be held in position by the washer 7.

Instead of having the flanges 10, hole 14 and plug 15, the slide may be constructed as shown in Figure 4, in which the rollers 16, of which two layers are shown by way of another example, are contained in an area by a supporting surface and two bounding walls by the aid of a spring clip 17 which extends along the top and sides of the slide and partly along the bottom thereof so as to grip the same and has in its top an aperture 18 which extends down its side to enable the chain or belt teeth to enter and leave the said area. Figures 5 and 6 show a similar spring clip which is indicated by the same reference numerals.

Figures 5 and 6 show an alternative construction of slots in the pulley parts 19 and lugs on the slide 20, which renders the use of collar or washers and screws unnecessary. The part 21 of each slot is wider than the rear part 22 thereof, the slots therefore being T-slots. That part 23 of each lug on the slide which engages the slot part 21 is narrower than the part 24 which engages the slot part 24. Therefore the lugs although free to slide in the slots are coupled to the pulley parts.

Figure 7 shows another alternative construction of pulley parts and slides. Each slide has two lugs 25 which extend through radial slots 26 in the two conical pulley parts 27 but are not necessarily a close sliding fit therein. The lugs 25 have holes which slidably engage radial guide rods 28 the inner ends of which fit in holes in the pulley parts 27 and the outer ends of which fit in holes 29 provided in lugs 30 which project from the pulley parts 27. The rods 28 are held against outward movement by screws 31 screwed into the lugs 30 and having truncated conical ends as shown.

A particularly suitable construction of endless chain is as follows:

The endless driving chain is composed of identical hollow or solid pins 32, Figures 1 to 3, and two different kinds of links 33 and 34 respectively. The end faces of the pins 32 serve as bearing surfaces to ride on the opposed conical faces of the pulley parts 1 and 2 and are correspondingly oblique to the pin axis. For a suitable distance from both sides of the transaxial centre of the pin 32, the pin is turned on an eccentric axis to cut out at one side of the pin a slot the base of which has the same radius as the pin, and is also turned on an eccentric axis diametrically opposite the first eccentric axis to cut out at the other side of the pin a second slot of the same radius. Each of the links 33 and 34 is a stamping and the links 34 have no teeth whilst the links 33 have one or, as shown, two teeth 13 formed integral with them and all of them have two pin holes of the same diameter as the circular ends of the pin 32. The links 33 and 34 and pins 32 are assembled by slipping the links onto the pins until they register with the said slots. Two or more toothed links 33 are arranged centrally on the pin in juxta-position, and one or more non-toothed links 34 are arranged at each side of the toothed links 33. The toothed links 33 alternate with the non-toothed links 34 along the length of the chain. When the chain is under tension the links are drawn into and held in the said slots and are thereby held against axial movement along the pins 32. They are however free to oscillate on the pins 32. Because the bearing surface constituted by the base of each slot is of the same radius as the pin 32 and the bearing surface constituted by the hole in the link is of the same radius, wear of the bearing surfaces is no greater than if no slots were provided. Furthermore the construction results in the existence of gaps or pockets 35 between the link holes and the pins 32 which serve to hold lubricant for the said bearing surfaces.

In the alternative construction of slide pin shown in Figures 8 and 9, the link pin 36 is turned on eccentric axis throughout its length so as to have a substantially oval form in cross-section with the long axis 38 of the cross-section meeting the lines 39 of the longest dimension and the line 40 of the shortest dimension on the periphery of the pin. The links are held against accidental disconnection from the pin 36 by split pins 37 extending through cross-holes in the pin 36.

In all constructions, the lugs are preferably extended outwards so that in whatever position the slide may be, the lugs fill the slots and thereby restore continuity to the conical faces of the pulley at the diameter where the lateral bearing faces of the belt or chain ride on the conical faces and thereby avoid the possibility of the bearing faces being damaged by the edges of the slots or sinking into the said slots. In the shown construction it will be observed that the lugs extend outwards so that, for example, as can be seen in Figures 1 and 2, the bearing end faces provided by the pins 32 bear on the lugs 6.

I claim:

1. An infinitely variable speed gear comprising a rotatable two-part adjustable V-pulley, a second rotatable two-part adjustable V-pulley, slides having gaps and mounted on the V-pulleys, a supporting surface on each slide, a mass of rollers held on each slide and rollable on each other and on the said supporting surface and accessible through the said gaps, an endless driving member mounted on the said pulley for transmitting motion from one pulley to the other, teeth on the driving member for penetrating the mass of rollers and establishing a direct driving connection therewith, and means on the driving member for riding on the V-pulleys.

2. An infinitely variable speed gear comprising a rotatable two-part adjustable V-pulley, a second rotatable two-part adjustable V-pulley, slides having gaps and mounted on the V-pulleys, a supporting surface on each slide, a mass of rollers not less in depth than twice the roller diameter held on each slide and rollable on each other and the said supporting surface and accessible through the said gaps, an endless driving member mounted on the said pulley for transmitting motion from one V-pulley to the other, teeth on the driving member for penetrating the mass of rollers and establishing a direct driving connection therewith, and means on the driving member for riding on the V-pulleys.

3. An infinitely variable speed gear comprising a rotatable two-part adjustable V-pulley, a second rotatable two-part adjustable V-pulley, slides of unitary construction having gaps and mounted on the V-pulleys, a supporting surface provided on each slide, a mass of rollers supported by the said supporting surface, flanges on each slide for retaining the mass of rollers on the slide by engagement with the rollers at their ends, a driving member on the pulleys for transmitting motion from one V-pulley to the other, and teeth on the driving members for direct connection with the mass of rollers.

4. An infinitely variable speed gear comprising a rotatable two-part adjustable V-pulley, a second rotatable two-part adjustable V-pulley, slides mounted on the V-pulleys, a supporting surface provided on each slide, a mass of rollers supported by the said supporting surface and held loosely in the slide, a closable filling hole in the slide for inserting the rollers into the slide, and an endless driving member running on the two V-pulleys.

5. An infinitely variable speed gear comprising a rotatable two-part adjustable V-pulley, a second rotatable two-part adjustable V-pulley, slides mounted on the V-pulleys, masses of rollers on the slides, removable spring clips provided on the slides for holding the rollers on the slides.

6. An infinitely variable speed gear, comprising rotatable expanding V-pulleys, slides on the V-pulleys, slots in the V-pulleys, integral lugs on the slides slidably engaging the said slots, and screws screwed into the said lugs for holding the lugs in engagement with the said slots.

7. An infinitely variable speed gear, comprising rotatable expanding V-pulleys, slides on the V-pulleys, perforated lugs on the slides, and guide rods on the V-pulleys slidably engaged by the perforated lugs for guiding the said slides.

8. An infinitely variable speed gear, comprising rotatable expanding V-pulleys, slots in the V-pulleys, slides on the V-pulleys, lugs on the slides engaging the said slots, an endless driving member on the V-pulleys, bearing surfaces on the endless driving member for riding on the pulleys, and extensions on the lugs for filling the said slots where the said bearing surfaces ride.

ALFRED BOOTH.

REFERENCES CITED

The following references are of record in the file of this patent:

UNITED STATES PATENTS

| Number | Name | Date |
| --- | --- | --- |
| 840,240 | Nicholson | Jan. 1, 1907 |
| 1,218,368 | Bucher | Mar. 6, 1917 |
| 1,946,798 | Kuchar | Feb. 13, 1934 |
| 2,328,544 | Booth | Sept. 7, 1943 |

FOREIGN PATENTS

| Number | Country | Date |
| --- | --- | --- |
| 373,679 | Great Britain | June 2, 1932 |
| 411,774 | Great Britain | June 14, 1934 |